(12) United States Patent
Kluck et al.

(10) Patent No.: US 11,865,482 B2
(45) Date of Patent: Jan. 9, 2024

(54) FILTER MODULE COMPRISING SENSOR AND METHOD FOR DETERMINING THE STATE OF A FILTER ELEMENT

(71) Applicant: Carl Freudenberg KG, Weinheim (DE)

(72) Inventors: Stefan Kluck, Reilingen (DE); Renate Tapper, Bensheim (DE)

(73) Assignee: CARL FREUDENBERG KG, Weinheim (DE)

( * ) Notice: Subject to any disclaimer, the term of this patent is extended or adjusted under 35 U.S.C. 154(b) by 144 days.

(21) Appl. No.: 17/173,211

(22) Filed: Feb. 11, 2021

(65) Prior Publication Data

US 2021/0245083 A1    Aug. 12, 2021

(30) Foreign Application Priority Data

Feb. 12, 2020 (EP) .................................. 20 156 997

(51) Int. Cl.
| | | |
|---|---|---|
| B01D 46/00 | (2022.01) | |
| B01D 46/12 | (2022.01) | |
| B01D 46/24 | (2006.01) | |
| B01D 46/44 | (2006.01) | |
| B01D 46/52 | (2006.01) | |
| B01D 46/58 | (2022.01) | |

(52) U.S. Cl.
CPC ......... *B01D 46/0086* (2013.01); *B01D 46/12* (2013.01); *B01D 46/2411* (2013.01); *B01D 46/444* (2013.01); *B01D 46/446* (2013.01); *B01D 46/521* (2013.01); *B01D 46/58* (2022.01); *B01D 2267/30* (2013.01)

(58) Field of Classification Search
CPC ................ B01D 46/0086; B01D 46/12; B01D 46/2411; B01D 46/444; B01D 46/446; B01D 46/521; B01D 46/58; B01D 2267/30; B01D 46/525
See application file for complete search history.

(56) References Cited

U.S. PATENT DOCUMENTS

| | | | | |
|---|---|---|---|---|
| 4,277,255 A | * | 7/1981 | Apelgren | B01D 46/448 55/284 |
| 4,304,492 A | * | 12/1981 | Fox | B01D 46/02 96/417 |
| 5,348,568 A | * | 9/1994 | Oda | B01D 46/70 95/20 |
| 6,093,229 A | * | 7/2000 | Lee | B01D 46/0086 55/385.2 |

(Continued)

FOREIGN PATENT DOCUMENTS

| | | | |
|---|---|---|---|
| CN | 110345597 A | * | 10/2019 |
| CN | 111318103 A | * | 6/2020 |

(Continued)

*Primary Examiner* — Dung H Bui
(74) *Attorney, Agent, or Firm* — LEYDIG, VOIT & MAYER, LTD.

(57) ABSTRACT

A filter module for filtering a fluid flow includes: a plurality of filter elements arranged parallel to one another in a fluid channel. A sensor is mounted on each filter element of the plurality of filter elements, each sensor being determining a loading state of a corresponding filter element. Each of the plurality of filter elements is a filter cartridge including plated filter medium. Each sensor is a flow sensor.

11 Claims, 5 Drawing Sheets

(56) References Cited

U.S. PATENT DOCUMENTS

| | | | |
|---|---|---|---|
| 6,171,366 B1* | 1/2001 | Vicard | B01D 46/44 55/293 |
| 6,203,591 B1* | 3/2001 | Clements | B01D 46/02 55/482 |
| 6,894,620 B2 | 5/2005 | Reinhardt | |
| 7,294,163 B1 | 11/2007 | Lacroix | |
| 9,938,980 B2 | 4/2018 | Claussen | |
| 2003/0052791 A1* | 3/2003 | Reinhardt | B60H 3/0616 454/158 |
| 2004/0123741 A1* | 7/2004 | Ohtake | B01D 46/446 96/420 |
| 2004/0261376 A1* | 12/2004 | Morgan | B01D 46/2411 55/302 |
| 2006/0187070 A1* | 8/2006 | Liang | B01D 46/0086 702/46 |
| 2007/0277592 A1* | 12/2007 | Johansson | B01D 46/10 73/38 |
| 2009/0114095 A1* | 5/2009 | Hanson | B01D 46/521 96/142 |
| 2009/0211455 A1* | 8/2009 | Gunther | B01D 46/0086 96/407 |
| 2009/0272263 A1* | 11/2009 | Bailey | F01N 9/002 95/278 |
| 2010/0010777 A1* | 1/2010 | Farmer | B01D 50/20 702/184 |
| 2010/0095656 A1* | 4/2010 | Kamiya | F01N 3/0253 60/287 |
| 2011/0023709 A1* | 2/2011 | Bosshard | B01D 46/442 96/417 |
| 2011/0214485 A1 | 9/2011 | Jornitz | |
| 2013/0036804 A1* | 2/2013 | Uehara | B01D 46/0086 73/114.31 |
| 2013/0186049 A1* | 7/2013 | Holler | B01D 46/442 55/342 |
| 2013/0239802 A1* | 9/2013 | Troxell | B01D 46/0086 95/20 |
| 2014/0130467 A1* | 5/2014 | Herman | B01D 50/20 55/414 |
| 2015/0059583 A1* | 3/2015 | Cornell | B01D 46/71 96/414 |
| 2015/0168913 A1* | 6/2015 | Yamaguchi | G03G 21/206 399/92 |
| 2015/0345439 A1* | 12/2015 | Gomez | F02M 35/0223 123/184.21 |
| 2016/0038868 A1* | 2/2016 | Kwon | B01D 46/0002 96/417 |
| 2016/0045854 A1* | 2/2016 | Hung | H04L 12/2827 95/25 |
| 2016/0129383 A1* | 5/2016 | Volk | F02M 35/02483 96/135 |
| 2017/0001137 A1* | 1/2017 | Lans | B01D 46/88 |
| 2018/0236386 A1* | 8/2018 | Bauer | B01D 46/56 |
| 2018/0258890 A1* | 9/2018 | Takamura | F02M 35/0245 |
| 2018/0290095 A1* | 10/2018 | Wei | F24F 8/80 |
| 2019/0015768 A1* | 1/2019 | Alderman | G01F 1/075 |
| 2019/0314748 A1* | 10/2019 | Green | B01D 46/88 |
| 2019/0388820 A1* | 12/2019 | Niakan | B01D 46/2411 |
| 2020/0269179 A1* | 8/2020 | Gustavsson | B01D 46/444 |
| 2020/0318584 A1* | 10/2020 | Clark | F02M 35/024 |
| 2021/0023494 A1* | 1/2021 | Oelsner | B01D 46/10 |
| 2021/0060473 A1* | 3/2021 | Caesar | B01D 46/0036 |
| 2021/0069624 A1* | 3/2021 | Takei | B01D 46/446 |
| 2021/0079841 A1* | 3/2021 | Yeung | F02C 7/052 |
| 2021/0394108 A1* | 12/2021 | Pietschner | B01D 46/0086 |
| 2022/0034245 A1* | 2/2022 | Wang | F01N 3/021 |
| 2022/0176294 A1* | 6/2022 | Garofalo | B01D 46/446 |

FOREIGN PATENT DOCUMENTS

| | | | | |
|---|---|---|---|---|
| CN | 112247848 A | * | 1/2021 | |
| DE | 10140510 B4 | | 2/2004 | |
| DE | 10245911 A1 | * | 4/2004 | B01D 46/0086 |
| DE | 102007039002 A1 | * | 2/2009 | B01D 46/0086 |
| DE | 102009026103 A1 | * | 1/2010 | B01D 46/0086 |
| DE | 102008057458 A1 | | 5/2010 | |
| DE | 102018127303 A1 | * | 4/2020 | B01D 46/002 |
| EP | 2638946 A1 | | 9/2013 | |
| ES | 2356852 T3 | * | 4/2011 | B01D 46/0086 |
| FR | 2842432 A1 | * | 1/2004 | B01D 46/18 |
| FR | 3087352 A1 | * | 4/2020 | |
| KR | 102339609 B1 | * | 12/2021 | B01D 46/0086 |
| WO | WO-2020049457 A1 | * | 3/2020 | B01D 35/143 |
| WO | WO 2020088899 A1 | | 5/2020 | |
| WO | WO-2022022418 A1 | * | 2/2022 | B01D 46/2411 |

\* cited by examiner

FILTER MODULE COMPRISING SENSOR AND METHOD FOR DETERMINING THE STATE OF A FILTER ELEMENT

CROSS-REFERENCE TO PRIOR APPLICATION

Priority is claimed to European Patent Application No. EP 20156997.7, filed on Feb. 12, 2020, the entire disclosure of which is hereby incorporated by reference herein.

FIELD

The invention relates to a filter module for filtering a fluid flow comprising a plurality of filter elements arranged parallel to one another in a fluid channel, wherein a sensor is mounted on each filter element. The invention also relates to a method for determining the state of a filter element.

BACKGROUND

In installations that have a need for clean air, it is standard practice to arrange a plurality of filter elements in parallel to one another in order to be able to provide a greater volume of cleaned air. Such a filter module with a plurality of filter cartridges is shown, for example, in U.S. Pat. No. 7,294,163 B1.

In order to monitor the state of the filter module, it is customary to measure the static pressure difference, i.e., the pressure loss, at the entire filter module. Since, however, the different filter elements of the filter module do not have to have the same loading state or only individual filter elements can have damage, this overall consideration is not very helpful to be able to provide information about the state of the individual filter elements. If the filter elements have differing states, this affects the distribution of the flow of air through the particular filter elements, and an asymmetrical air flow through the filter module results. If, for example, one of the filter elements is now damaged, the measurement variable of "pressure loss at the filter module" will not change or not detectably change. The same applies if a filter element is very heavily loaded and can no longer contribute to the purification of the air. The greater the number of filter elements installed in parallel, the lower is the influence of the state of a single filter element (and e.g. of its loading state or defect) on the measured pressure loss. If, for example, one filter element is defective and has an aperture, and another filter element is heavily loaded and does not allow much air to pass through, then the measured pressure loss at the entire filter module can supply an unsuspicious value, which does not allow the true state of the individual filter elements to be inferred.

A disadvantage of the global measurement of the pressure loss is that individual filter elements cannot be cleaned or replaced at the ideal point in time, since their individual state is not known. Therefore, more energy must be expended for the operation of the filter module. If the filter elements are cleaned or replaced prophylactically or too soon, this has a disadvantageous effect on the overall performance or the costs.

A further problem is that a raw gas-side measuring point and a clean gas-side measuring point are required for measuring the pressure difference. The measuring point on the raw gas side is susceptible to contamination, which entails the risk of failure of the measuring system.

DE 101 40 510 B4 shows a filter module comprising only one filter element. A sensor is mounted on the filter element to be able to determine the current air velocity through the filter. Since only one filter element is provided in the filter module, the problem described above does not exist here.

In addition to measuring the flow velocity of a fluid, the measurement of the volumetric flow or the mass flow of fluids is also known, in principle.

SUMMARY

In an embodiment, the present invention provides a filter module for filtering a fluid flow, comprising: a plurality of filter elements arranged parallel to one another in a fluid channel, wherein a sensor is mounted on each filter element of the plurality of filter elements, each sensor being configured to determine a loading state of a corresponding filter element, wherein each of the plurality of filter elements comprises a filter cartridge including plated filter medium, and wherein each sensor comprises a flow sensor.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
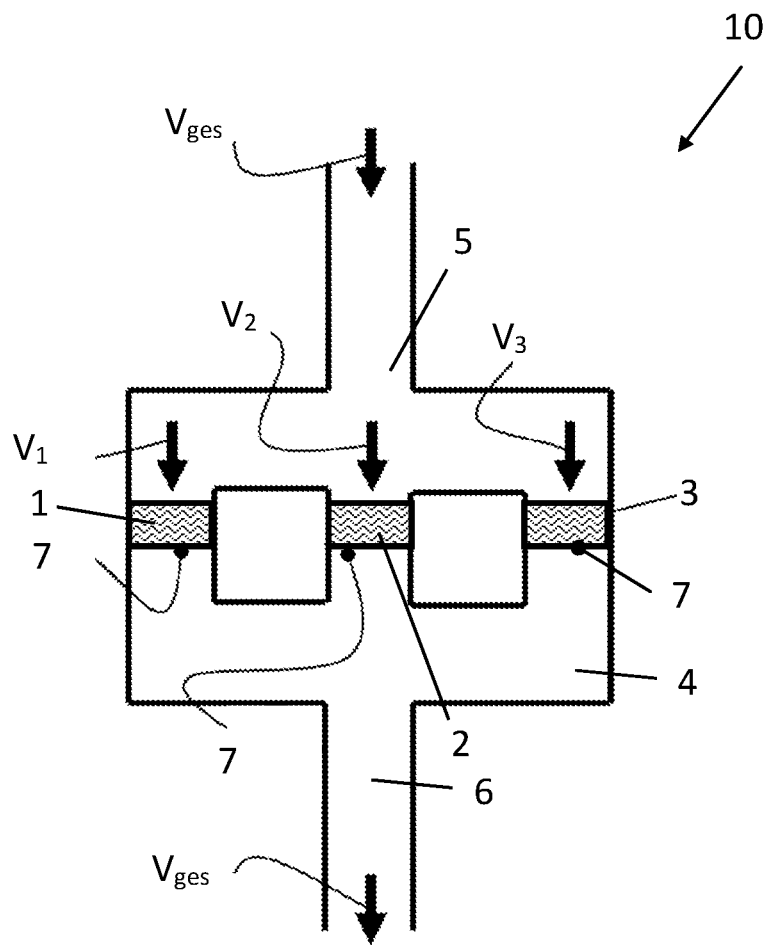
FIG. 1 shows the design of a filter module according to the invention.

In an embodiment, the present invention provides a filter module comprising a plurality of filter elements, with which the state of the individual filter elements can be determined.

In an embodiment, the present invention provides a method by which a determination of the state of individual filter elements of a filter module is made possible.

In an embodiment, the present invention provides a filter module having the features detailed below.

According to the invention, it was found to be advantageous to assign a sensor for determining the loading state to each filter element:

The filter module according to the invention is used to filter a fluid flow, in particular an air flow, and comprises a plurality of filter elements arranged parallel to one another in a fluid channel, in particular an air channel, wherein the fluid flow passes through the filter elements from a raw gas side to a clean gas side, and the fluid, in particular air, is filtered, i.e., purified, in the process. The arrangement of the filter elements is that of a parallel connection. The filter elements of the filter module are designed as filter cartridges including a plated filter medium, i.e., as bellows with zigzag folding.

Advantageously, a sensor is attached to each filter element for indirectly or directly determining the state of the respective filter element, in particular of its loading state or aging state.

It has proven to be advantageous to design the sensors as flow sensors and to measure the magnitude of the flow of a particular partial fluid flow through a particular filter element. Such sensors are also referred to as flow measuring devices or flow meters. In the process, flow means, inter alia, the velocity, the quantity or the mass of the fluid moved through a filter element.

Such a filter module has the advantage that the state of the individual filter elements can be determined and not just global information can be provided about the entire filter module. This makes it possible to intervene if individual filter elements are not fully functional.

In a particularly advantageous and therefore preferred refinement of the filter module, the sensors are positioned on the clean gas side of a particular filter element and are thus protected against contamination.

In a refinement of the filter module, each filter cartridge has a round flange with a central recess, and the sensor is mounted in each case in the region of the flange, that is to say on the clean gas side.

According to a first variant, the flow sensors can measure the differential pressure in a particular filter element, taking into account the dynamic pressure, for example using a Prandtl probe, i.e., a sensor having a design based on the so-called Prandtl tube, a static pressure probe or a differential pressure standard orifice plate.

In this variant, for example, the dynamic pressure at the constriction at the flange can be measured against the local static pressure. The variable is a direct gauge for the flow rate. This corresponds to an individual modification of a differential pressure standard orifice plate. It is advantageous in the process not to calibrate to an additionally introduced orifice plate geometry, but rather to a geometry that is already present in the design, namely the constriction of the flange.

According to a second variant, the flow sensors can measure the flow velocity of the fluid, for example the air in or after a particular filter element, for example by means of vane anemometers, hot wire anemometers or the like.

The invention also relates to a method for determining the state, in particular the loading state or aging state, of a filter element in a filter module comprising a plurality of filter elements arranged parallel to one another in a fluid channel, in particular an air channel, in particular as described above. The method comprises the following steps:

measuring the flow of fluid, in particular air, through a particular filter element by means of a so-called flow sensor. In principle, different measurement variables may be suitable, provided that they represent a gauge for the flow rate.

comparing the measurement result to flow values stored in a memory for the particular filter element. The comparison can be carried out in a processing unit which is positioned outside the filter module. For this purpose, the measured values are forwarded to the processing unit by way of data transmission, for example by means of near field communication (NFC) and/or the Internet. The processing unit can comprise a data memory or can be connectable to a data memory, in which empirical values, target flow values, loading states and/or limit values are stored. The stored flow values can be empirical values which are ascertained, for example, on the new, uncontaminated and fully functional filter element.

deriving the state, in particular the loading state and/or aging state, of a particular filter element based on the previously executed comparison by the processing unit.

During the measurement in the first method step, the flow velocity or the differential pressure of the fluid, for example the air in the filter element, can preferably be detected. Based on these measured values, the volume flow can also be calculated (namely by multiplying the measured values of the flow velocity with the cross-sectional area through which the flow occurs), and the volume flow can be further evaluated.

In a refinement of the method, a check is carried out in an additional step as to whether a measurement result falls below or exceeds a predefined limit value and/or whether a temporal change of the measurement results deviates from a stored empirical value and, if applicable, a signal is subsequently output.

The limit values and stored empirical values are in each case to be established specifically for one type of filter element. It is also possible to define graduated limit values in order to implement different warning levels, for example to advise of a poor loading state to be expected soon, to communicate a critical loading state, and to issue a warning when a loading state is present with expected consequential damages.

A check can be carried out as to whether the flow exceeds a certain limit value. This can be an indication that the filter element is defective and has, for example, a hole in the filter medium.

A check can be carried out as to whether the loading state exceeds a certain limit value or whether the flow is below a certain limit value. This can be an indication that the filter element is heavily clogged with particles and can no longer fulfill its filtration task to a sufficient degree.

A check can be carried out as to whether the change of the loading state over time deviates greatly from a certain tolerable empirical value. This can be an indication that the filter element has already aged greatly, has already reached the end of its service life, and consequently its filtration performance is no longer sufficient.

Depending on the result of the check, the signal can be a
  warning signal to a machine or equipment operator, for example via a screen of the machine or equipment control unit or via a mobile device (smart phone or tablet);
  deactivation signal to a machine or equipment operator;
  deactivation signal of a machine or equipment, which brings about a direct intervention in the machine or equipment control unit;
  trigger signal for a cleaning process of the filter element;
  trigger signal for a predictive maintenance order for maintaining or repairing the filter element; or
  trigger signal for an order process of a replacement filter element, e.g. by ordering in an online shop.

The signal preferably includes information which allows an association with a specific filter element of the plurality of filter elements in the filter module. The signal could, for example, include the information that the filter element at the rear left is defective, another signal could include the information that the filter at the front right is at the end of its service life, and in both instances a warning signal could be output to the machine or equipment operator, either via a monitor of the machine or equipment control unit or via a mobile device (smart phone or tablet).

The invention also relates to a system comprising a filter module as described above, wherein the system is designed as an energy generation system, as a dust removal system for exhaust gas purification, as a turbomachine or as a production system. Turbomachinery is also referred to as fluid machinery and can be implement, for example, as a gas turbine or as a compressor. The production system can be used in surface engineering, for example as a painting system, in the production of pharmaceutical products or for the production of food or beverages.

The described invention and the described advantageous further embodiments of the invention constitute advantageous further embodiments of the invention also in combination with one another, insofar as this is technically reasonable.

Reference is made to the dependent claims and the description of exemplary embodiments, with reference to the accompanying figures, with regard to further advantages and embodiments of the invention that are advantageous from a design and functional standpoint.

The invention will now be explained in more detail using accompanying Figures. Corresponding elements and components are provided with the same reference symbols in the figures. For the sake of better clarity of Figures, a presentation that is true to scale has been dispensed with.

FIG. 1 shows the design of a filter module 10 according to the invention. A plurality of filter elements are arranged in an air channel 4 of the filter module 10, here a first filter element 1, a second filter element 2 and a third filter element 3, which are arranged in a parallel connection. However, a larger number of filter elements which are arranged in a matrix-like manner is also conceivable. Air flows from a raw gas side 5 to a clean gas side 6 and is filtered in the process. A total volume flow $V_{ges}$ flows at the inlet and outlet of the filter module 10. This total volume flow $V_{ges}$ is divided in such a way that a first partial volume flow $V_1$ flows through the first filter element 1, a second partial volume flow $V_2$ flows through the second filter element and a third partial volume flow $V_3$ flows through the third filter element. In order to be able to provide information about the state of a particular filter element 1, 2, 3, a sensor 7 is arranged on each of the filter elements 1, 2, 3 on its clean gas side, which is used to measure the flow through the particular filter element 1, 2, 3.

Figure 2:
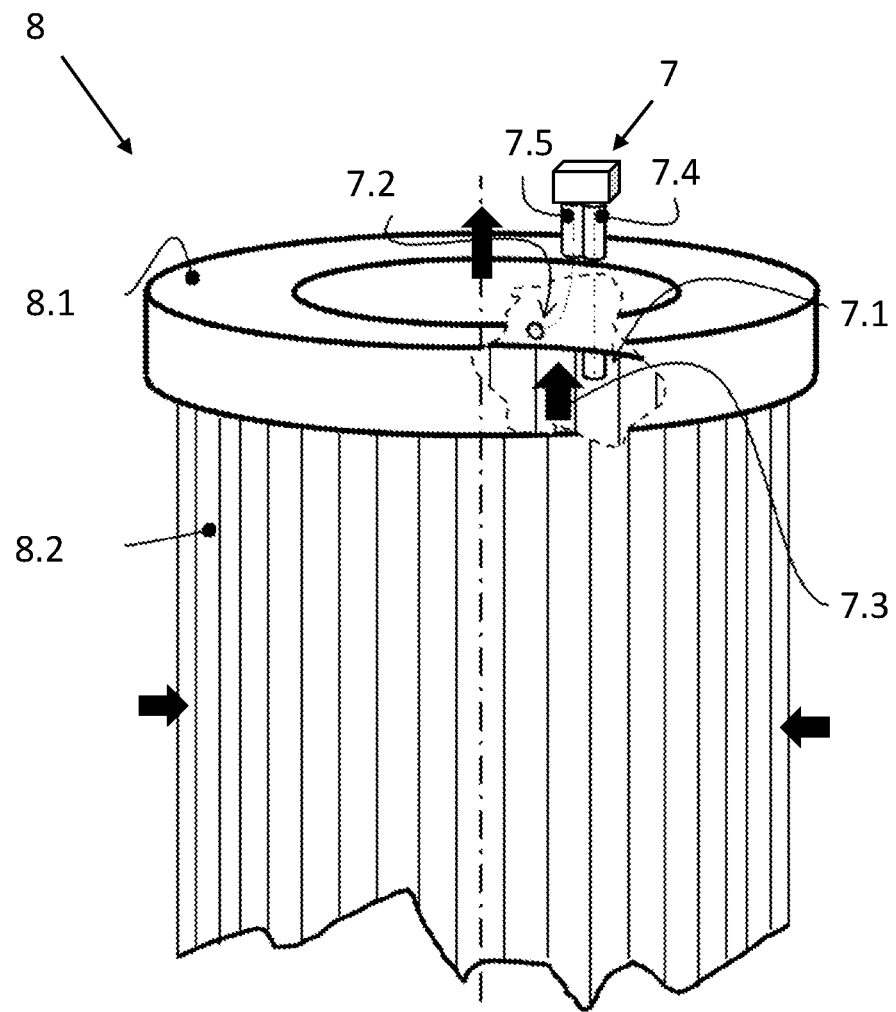
FIG. 2 shows a filter element in the form of a filter cartridge.

FIG. 2 shows a filter element 1, 2, 3 in the form of a filter cartridge 8. Such filter elements 1, 2, 3 can be used in a filter module 10. The filter cartridge 8 includes a pleated filter medium 8.2, which has been rolled into a cylindrical shape. The filter medium 8.2 is held by a round bottom, and a likewise round flange 8.1 with a central cut-out. Air to be filtered—as shown by the arrows—enters at the lateral surface of the filter cartridge 8, flows through the filter medium 8.2 and leaves the filter cartridge through the cut-out in the flange 8.1. A sensor 7 for measuring the flow through the filter cartridge 8 is mounted on the clean gas side in the region of the flange 8.1.

Figure 3:
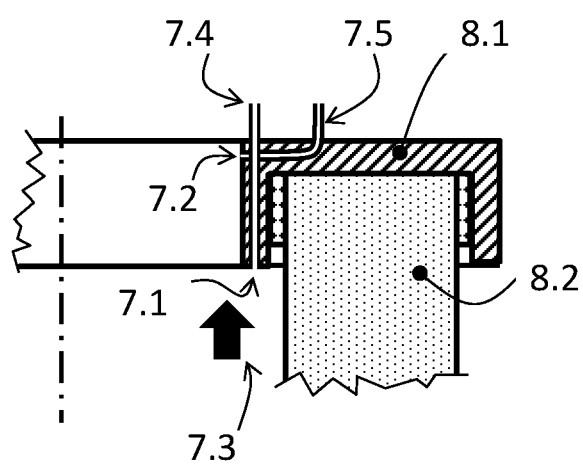
FIG. 3 shows a detailed illustration of FIG. 2.

FIG. 3 is a detailed illustration of FIG. 2, which shows the design of the sensor 7 in more detail, more precisely: its sampling sites. The design of the sensor 7 is based on the measuring principle of the Prandtl tube: pressure sampling locations were established in the region of the flange 8.1 as a measuring location for the clean gas-side total pressure 7.1 and as a measuring location for the clean gas-side static pressure 7.2, which are located in the region of the main flow direction of the air (indicated by an arrow 7.3) and thus allow representative measurement results. In a continuation of the measuring location for the clean gas-side total pressure 7.1 and the measuring location for the clean gas-side static pressure 7.2, channels are introduced in the flange 8.1, which lead to measurement inputs of a pressure differential sensor 7.4, 7.5. The differential pressure is measured in the pressure differential sensor 7.4, 7.5 and converted into an electrical measurement signal, which represents a gauge for the flow through the filter cartridge 8. The measurement signal can be forwarded to a processing unit by way of data transmission using transmission technology for further processing and evaluation.

Figure 4:
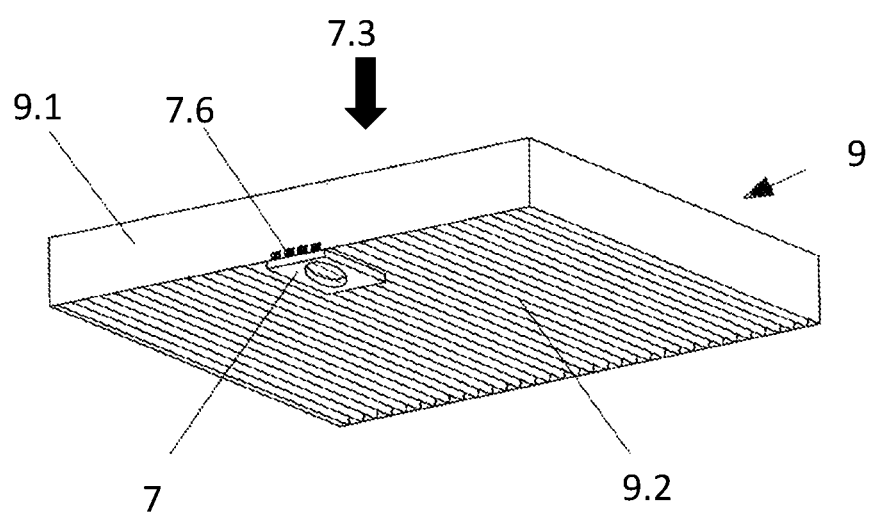
FIG. 4 shows a rectangular filter element.

FIG. 4 shows a rectangular filter element 1, 2, 3 in the form of a folded filter 9. A plated filter medium 9.2 is received by a frame 9.1. A sensor 7 for measuring the flow through the folded filter 9 is arranged on the clean gas side at the folded filter 9. The sensor 7 is positioned in the main flow direction 7.3. In order to transmit the measurement results, the sensor 7 includes electrical contacts 7.6, which enable data transmission to a processing unit. Such folded filters 9 can also be used in a filter module.

The filter and sensor types shown and described are only provided by way of example. Other types of filters and sensors are also conceivable.

Figure 5A:
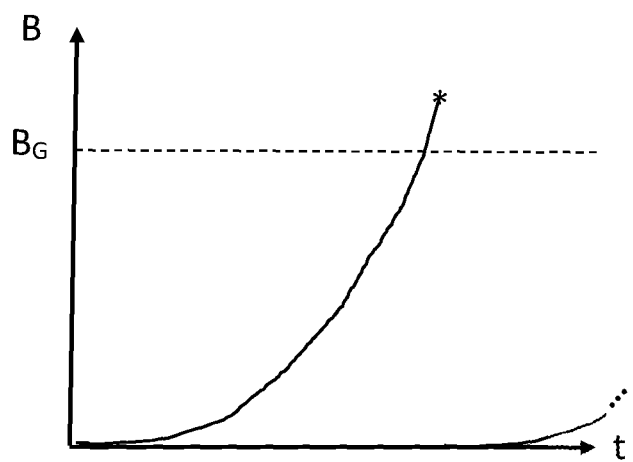
FIGS. 5a and b show diagrams for representing the loading state and the flow rate.

FIG. 5a shows a diagram for illustrating the loading state of a filter element 1. Over the course of the time t, the loading B of a filter element 1 increases. If a stored limit value $B_G$ is exceeded, a signal is output, for example a warning signal to the machine operator "Please change filter element 1." The point in time of the replacement of the filter element 1 is indicated by an asterisk *. The new filter element 1 has a loading B of zero, and the loading B increases again over the course of the subsequent time.

Figure 5B:
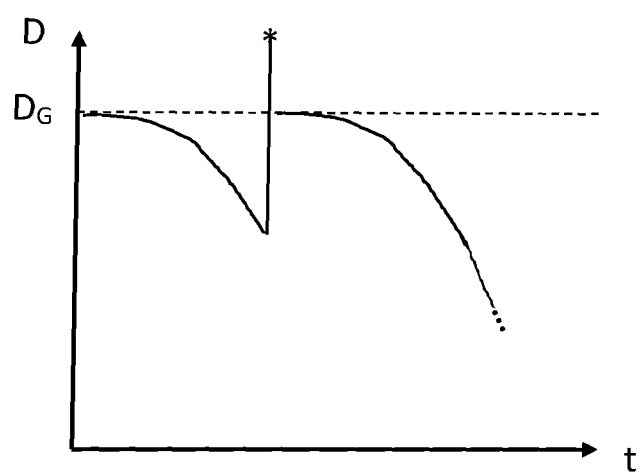

FIG. 5b shows a diagram for illustrating the flow rate D through a filter element 1. Over the course of the time t, the flow rate D of a filter element 1 decreases. However, the flow rate D suddenly rises sharply, for example as a result of damage to the filter medium. If a stored limit value $D_G$ is exceeded, a signal is output, for example a warning signal to the machine operator "Please check filter element 1." The point in time of the check and of the replacement of the filter element 1 is indicated by an asterisk *. The new filter element 1 has a normal flow rate D again, and the flow rate D decreases again over the course of the subsequent time due to loading of the 1 filter element.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 First filter element
2 Second filter element

3 Third filter element
4 Fluid channel, e.g. air channel
5 Raw gas side
6 Clean gas side
7 Sensor
7.1 Total pressure measuring location, clean gas side
7.2 Static pressure measuring location, clean gas side
7.3 Main flow direction
7.4 Measurement input, pressure differential sensor
7.5 Measurement input, pressure differential sensor
7.6 Electrical contacts (connection)
8 Filter cartridge
8.1 Flange
8.2 Filter medium
9 Rectangular folded filter
9.1 Frame
9.2 Filter medium
Filter module
$V_1$ Partial volume flow through the first filter element
$V_2$ Partial volume flow through second filter element
$V_3$ Partial volume flow through third filter element
$V_{Total}$ Total volume flow through the filter module
D Flow rate
$D_G$ Limit value of flow rate
B Loading state
$B_G$ Limit value, loading state

What is claimed is:

1. A filter module for filtering a fluid flow, comprising:
a plurality of filter elements arranged parallel to one another in a fluid channel,
wherein a sensor is mounted on each filter element of the plurality of filter elements, each sensor being configured to determine a loading state of a corresponding filter element,
wherein each of the plurality of filter elements comprises a filter cartridge including pleated filter medium,
wherein each sensor comprises a flow sensor,
wherein each sensor is positioned on a clean gas side of the corresponding filter element,
wherein each filter cartridge comprises a round flange having a central cut-out, and the sensor is provided in each case in a region of the flange, and
wherein each sensor is configured to measure a dynamic pressure of the fluid flow at the flange.

2. The filter module according to claim 1, wherein the sensors are configured to measure volume flow or mass flow.

3. The filter module according to claim 1, wherein the sensors are configured to measure flow velocity.

4. The filter module according to claim 1, wherein the sensors are configured to measure differential pressure.

5. A method for determining the loading state and/or aging state of the filter element in the filter module according to claim 1, comprising the following steps:
a) measuring the flow of fluid through a particular filter element;
b) comparing a measurement result from a) to flow values stored in a memory for the particular filter element; and
c) deriving the loading state and/or aging state of the particular filter element based on a comparison carried out according to b).

6. The method according to claim 5, wherein the measurement in a) detects a flow velocity or a differential pressure of a fluid in the filter element.

7. The method according to claim 5, further comprising:
b') checking whether the measurement drops below or exceeds a predefined limit value and/or whether a change of the measurement over time deviates from a stored empirical value; and subsequently d) outputting a signal.

8. The method according to claim 7, wherein the signal comprises a:
warning signal to a machine or equipment operator;
deactivation signal to a machine or equipment operator;
deactivation signal of a machine or equipment;
trigger signal for a cleaning process of the filter element;
trigger signal for a predictive maintenance order; or
trigger signal for an order process of a replacement filter element.

9. A system, comprising:
the filter module according to claim 1,
wherein the system comprises an energy generation system, an exhaust gas flow purification system, a turbomachine, or a production system.

10. The filter module according to claim 1, wherein each flange includes an opening, and wherein clean gas filtered by the filter cartridges is configured to pass through the opening of each flange.

11. The filter module according to claim 10, wherein the sensors are configured to measure flow of clean gas exiting the filter cartridges.

* * * * *